United States Patent [19]

Honkanen et al.

[11] 3,860,573

[45] Jan. 14, 1975

[54] METHOD FOR CROSS-LINKING AGAROSE OR AGAR

[75] Inventors: Erkki Juhani Honkanen; Anna Maija Teppo, both of Haukilahti, Finland

[73] Assignee: Orion-Yhtymä Oy, Helsinki, Finland

[22] Filed: Sept. 29, 1972

[21] Appl. No.: 293,560

[52] U.S. Cl. .......................... 260/209 R, 260/112 R
[51] Int. Cl. ...................... C07c 47/18, C07c 95/04
[58] Field of Search ..................... 260/209 R, 234 R

[56] References Cited
UNITED STATES PATENTS
3,277,025  10/1966  Flodin et al. .................... 260/209 R
3,651,043  3/1972  Schell et al. .................... 260/209 R

*Primary Examiner*—Johnnie R. Brown
*Attorney, Agent, or Firm*—Richards & Geier

[57] ABSTRACT

A method for cross-linking agarose or agar, wherein the agarose or agar is suspended and then reacted with a bifunctional compound. The invention is particularly characterized in that as the bifunctional compound a compound is used which contains two equal functional groups. These functional groups are chosen from the following: —COCl, —$SO_2$Cl, and —N=C=S. The cross-linked agarose or agar is finally filtered and washed.

8 Claims, No Drawings

METHOD FOR CROSS-LINKING AGAROSE OR AGAR

The present invention concerns a method for cross-linking agarose or agar, wherein the agarose or agar is first suspended and then reacted with a bifunctional compound.

Agarose is neutral polysaccharide having a molecular weight about 120,000 (*Biochem. Biophys. Acta* 165, p. 43–58, 1968: T. G. L. Hickson and A. Polson, "Some physical characteristics of the agarose molecule"). D-galactose and 3,6-anhydro-L-galactose alternate in the polysaccharide chain (Bull. Chem. Soc. Japan 29, p.543, 1956: C. Araki and Advances in Carbohydrate Chemistry and Biochemistry, Academic Press 1969, Vol. 24, p. 277–278: D. A. Rees, "Polysaccharide gels and networks").

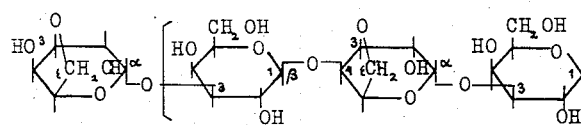 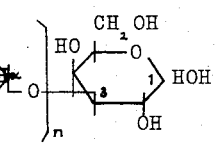

Agarose forms on heating in aqueous solutions and subsequent cooling, a firm, transparent gel. Such neutral agarose gels are used e.g., as substrates for microorganisms and in immunodiffusion and electrophoresis techniques.

In the use of agarose for the purposes mentioned, inconveniences have been encountered. These include: that separation of certain proteins at electrophoresis is poor; that the syneresis phenomenon of agarose (meaning spontaneous separation of water from the gel during storage) causes inconvenience when agarose is used to make products (substrates for microorganisms, dip slide products) which are susceptible to variable temperatures during transport, storage or use; that the hydrophilia of agarose causes in dip slide products, in which the gel cooked into an appropriate nutrient solution has been poured onto a plastic base, the gel to detach from its base.

It is known in prior art, e.g., from the U.S. Pat. No. 3,507,851, to cross-link the agarose. Epichlorohydrin has then been used as a bifunctional compound. This compound contains two different functional groups. It is then only possible to alter the number of cross-linkages in the agarose but not the length of the hydrocarbon chains nor therefore the chemical character of the agarose, and the drawbacks mentioned above are not eliminated by this means.

The aim of the present invention is to eliminate the drawbacks mentioned. The invention is characterized in that in the cross-linking process of agarose as the bifunctional compound a compound is used which has two equal functional groups, consisting of one of the following: $-COCl$, $-SO_2Cl$, or $-N=C=S$, and that the cross-linked agarose obtained is filtered and washed.

Agaroses cross-linked as taught by the invention have certain properties which render them better appropriate than before to their previous uses and, furthermore, enable the agarose to be used in new connections. A few examples are given in the following.

1. Molecular sieve effect

Agaroses cross-linked in accordance with the present invention have, in addition to their absorption properties, also the capability of acting as a molecular sieve. This ability is more pronounced accordingly as the number of interbridging linkages (the CL degree) is higher.

In gel electrophoresis technique, e.g., in electrophoretic fractionating of proteins, this characteristic is a great advantage, especially when it is desired to separate proteins having otherwise equal electrophoretic mobility.

For instance, haemopexin and transferrin, which are difficult to separate, can be separated by this technique. The table below shows the influence of the number of cross linkages (interbridges) on the separation of haemopexin and transferrin. The agarose was cross-linked according to the invention using succinic acid dichloride, and the run was at pH 8.6 in a 2 percent agarose medium.

| CL degree, % | Ratio of distances travelled by haemopexin and transferrin |
|---|---|
| 0 | 1.00 |
| 4 | 1.09 |
| 6 | 1.17 |
| 9 | 1.25 |
| 12 | 1.29 |
| 15 | 1.35 |
| 20 | 1.45 |

In immunoelectrophoresis of proteins too, where the proteins are first fractioned by electrophoresis and subsequently demonstrated by gel precipitation technique, the following advantages are gained by using cross-linked agaroses: (1) separation even of proteins difficult to separate is achieved (e.g., haemopexin and transferrin; pre-$\beta$-lipoprotein, IgA and IgG), (2) substantially sharper precipitates are obtained. This has a great significance in practice, since the reading of immunoelectrophorograms difficult to interprete is facilitated and the information gained increases.

In Laurell's technique (C. B. Laurell, *Anal Biochem* 15(1966)45), quantitative determination of proteins is carried out in an electric field in agarose gel containing antiserum. The proteins moving in the electric field are precipitated under effect of the antiserum in the gel. The area of the rocket-shaped precipitation obtained is proportional to the quantity of the particular protein. However, the determination of certain proteins, above all of immunoglobulins, by this technique has been difficult using normal agarose. Owing to their high molecular weight (IgG — 160,000; IgM — 960,000) the immunoglobulins travel only slowly towards the anode in the electric field (at pH 8.6). Simultaneously, the agarose moves towards the cathode (so-called endosmosis) and carries the immunoglobulins along with it.

When cross-linked agaroses are used, the Laurell technique may also be applied for quantitative determination of immunoglobulins. Cross-linking reduces the endosmosis effect of agarose, and as a result of the molecular sieve action of cross-linked agaroses the movement of large molecules in the gel is more rapid.

When conventional agarose was replaced according to the invention by agarose cross-linked to the extent of 20 percent with p-phenylene-diisothiocyanate, we achieved a reduction of the running time requisite for determination of IgM from 17 to 8 hours. This implies in practice that by using cross-linked agaroses it is also possible to determine immunoglobulins by the Laurell technique and, furthermore, by choosing an appropriate CL degree the determination can be accomplished within a normal working day, which is a decisive advantage especially in hospitals.

2. Higher stability

A phenomenon typical of agarose is that of syneresis, which is understood to be the spontaneous separation of water from the gel during storage. This is believed to be due to the fact that the gel does not have time to gain a thermodynamic equilibrium when it rapidly solidifies, whereby at temperature changes the internal structure of the gel changes and the water that has been bound in the gel is set free.

This phenomenon is highly harmful when agarose is used to make products (substrates for microorganisms, dip slide products, etc.) which in the course of transport, storage or use are exposed to variable temperatures.

By cross-linking the agarose in accordance with the invention a gel has been obtained which is more stable and better resistant to temperature changes. The best results in this respect have been achieved with a low number (2 to 10 percent) of cross-linkages.

Cross-linked agaroses are thus considerably better appropriate for products required to undergo transport and prolonged storage than conventional agarose.

When the agarose is cross-linked with compounds having a hydrocarbon chain or a phenylic group (e.g., with long-chained acid dichlorides or with phenylenediisothiocyanates), the hydrophilia of the agarose can be reduced and thereby the permanent adherence of the gel to a hydrophobic base improved.

4. Preparation of protein absorbents

When agarose is cross-linked with interbridges containing suitable active groups, it is possible to use cross-linked agarose obtained for the manufacturing of protein absorbents. The following example serves to illustrate this.

Agarose is cross-linked according to the invention with malonic acid dichloride. The active hydrogen atoms between two carboxyl groups in the interbridge can be made (by using the Knoevenagel condensation previously known in itself) to condense with dialdehydes so that one of the two aldehyde groups remains free and is able to condense with the amino group of proteins.

As has been said, the method is based on the reactions with the hydroxyls of agarose, of bifunctional organic compounds having two equal functional groups, consisting of one of the following: —COCl, —SO$_2$Cl, or —N=C=S. In the following, in the form of a list part of those compounds are given which contain one of the above-mentioned functional groups and which have been used in a method according to the invention.

I. Dicarboxylic acid chlorides, having the functional group —COCl.

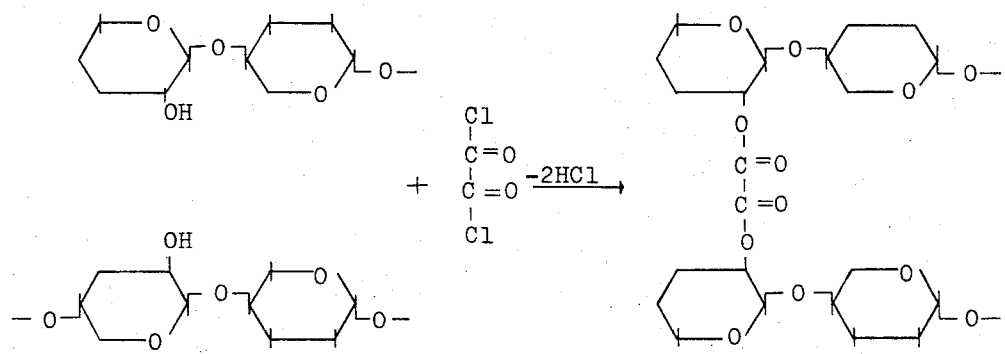

Gel made of cross-linked agaroses or agar seems to be better suited for cultivation of bacteria, also in microbiological respects, than common agarose. Using agaroses cross-linked (5 to 20 percent) with succinic acid dichloride (2 percent agarose in nutrient agar broth), for instance larger colony size and more luxuriant growth of enterococci was obtained; likewise with certain staphylococcus species (S. albus and S. aureus) the density of growth was better than when common agarose was used.

3. Lower hydrophilia

In dip slide preparations (e.g., "Uricult"), gel cooked into an appropriate nutrient solution has been poured upon a plastic base. However, the hydrophobic plastic material tends to "reject" the hydrophilic agarose gel, quite often with the result of detachment of the gel from its base during storage.

Of these, the following may be mentioned:

1. Saturated dicarboxylic acid chlorides, e.g., oxalic acid dichloride, malonic acid dichloride, succinic acid dichloride, glutaric acid dichloride, adipic acid dichloride, pimelic acid dichloride, etc., 2. Unsaturated dicarboxylic acid chlorides, e.g., maleic acid dichloride, 3. Cycloalkylene dicarboxylic acid chlorides, e.g., cyclopentane-1,2-dicarboxylic acid chloride, cyclopentane-1,3-dicarboxylic acid chloride, cyclohexane-1,3-dicarboxylic acid chloride, cyclohexane-1,4-dicarboxylic acid chloride, etc.

4. Aromatic dicarboxylic acid chlorides, e.g., phthalic acid dichloride, isophthalic acid dichloride, terephthalic acid dichloride, naphthalene-1,2-dicarboxylic acid chloride.

II. Aryldisulphonic acid chlorides, having the functional group -SO$_2$Cl. Of these may be mentioned, for instance, benzene-1,3-disulphonic acid chloride.

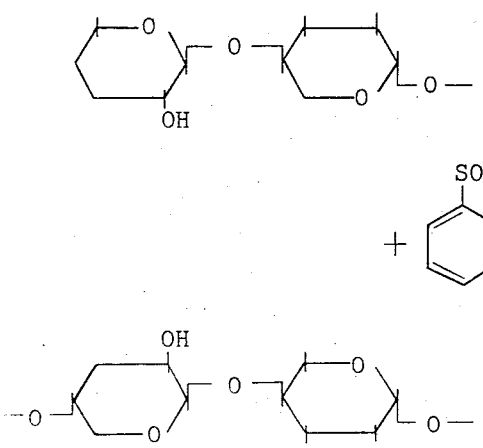 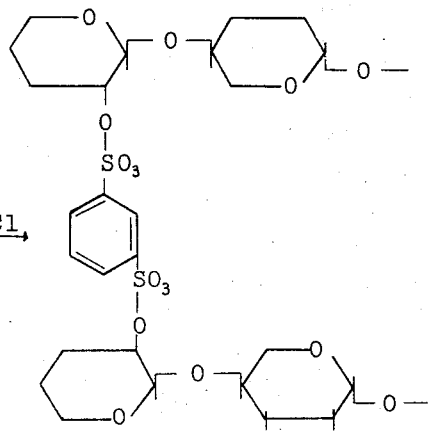

III. Diisothiocyanates, having the functional group —N=C=S.

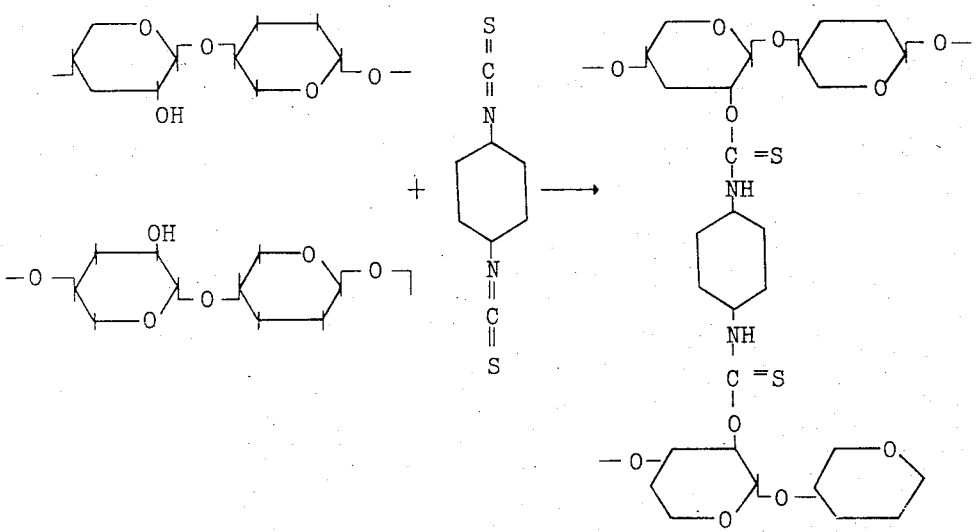

Of these, the following may be mentioned:

1. Aliphatic diisothiocyanates, e.g., ethylene-1,2-diisothiocyanate, butylene-1,4-diisothiocyanate, hexylene-1,6-diisothiocyanate, octylene-1,8-diisothiocyanate, decylene-1,10-diisothiocyanate, butylene-1,3-diisothiocyanate, etc., 2. Aromatic diisothiocyanates, e.g., p-phenylene diisothiocyanate.

In addition to the compounds presented above, there are numerous other compounds by which also a similar formation of intermediate bridges is achieved, these compounds having as reactive groups two equal —COCl, —SO$_2$Cl or —N=C=S groups. The following examples illustrate the method in greater detail.

EXAMPLE 1

5 g of agarose or agar are suspended in benzene; $n \times 0.18$ g triethylamine ($n = 1 \ldots 10$) are added. The reaction mixture is cooled close to the freezing point of benzene (about +6°C) and $n \times 0.1$ g oxalic acid chloride are added under powerful agitation. The temperature is allowed to rise up to +25°C (not higher) and the agitation is continued for another 6 hrs. The cross-linked agarose thus obtained is filtered and carefully washed with benzene, water and acetone and allowed to dry at room temperature.

EXAMPLE 2

5 g of agarose are suspended in ether; $n \times 0.14$ triethylamine ($n = 1 \ldots 10$) are added. The suspension is cooled to about +6°C and thereafter $n \times 0.1$ g maleic acid dichloride are added. Continuation as in Example 1.

EXAMPLE 3

5 g of agarose are suspended in petrol ether; $n \times 0.12$ g N,N-dimethylaniline ($n = 1 \ldots 10$) are added. To the cooled (+6°C) suspension $n \times 0.1$ g cyclohexane-1,2-dicarboxylic acid chloride are added. Continuation as in Example 1.

EXAMPLE 4

5 g of agarose are suspended in toluene; $n \times 0.1$ g triethylamine ($n = 1 \ldots 5$) and $n \times 0.1$ g phthalic acid dichloride are added. Continuation as in Example 1.

EXAMPLE 5

5 g of agarose are suspended in dioxane. In the mixture, $n \times 0.11$ g ($n = 1 \ldots 10$) of crystal water-free, recently dried sodium acetate are dissolved, and at about +10°C, under agitation, $n \times 0.1$ g succinic acid dichloride are added. Continuation as in Example 1.

EXAMPLE 6

5 g of agarose are suspended in ether; $n \times 0.075$ g triethylamine ($n = 1 \ldots 5$) and n $\times$ 0.1 g benzene-1,3- disulphonic acid chloride are added. Reaction at +10 ... 30°C for 2-4 hrs is allowed. Continuation as in Example 1.

EXAMPLE 7

5 g of agarose are suspended in toluene; $n \times 0.1$ g ($n = 1 \ldots 20$) p-phenylene-diisothiocyanate are added. Under powerful agitation, the mixture is heated under a reflux cooler at the boiling point of toluene (+110°C) for 8 hrs. Upon filtration, the cross-linked agarose thus obtained is washed with toluene and allowed to dry at room temperature.

EXAMPLE 8

5 g of agarose are suspended in dioxane; $n \times 0.1$ g $n = 1 \ldots 20$) butyl-1,4-diisothiocyanate are added. Heating at the boiling point of dioxane (+101°C) as in Example 7 is followed by washing with dioxane and acetone and drying at room temperature.

In all the reactions similar to the examples presented above, other inert organic solvents may also be used as solvent, for instance, ether, petrol ether, benzene, toluene, dioxane, etc., or different mixtures of these.

In reactions similar to those mentioned in Examples 1 to 5 one may use, for binding the liberated hydrochloric acid, also other secondary or tertiary amines in addition to the amines mentioned, e.g., dimethylaniline, diethylaniline, triethylamine, pyridine, N-ethylpiperidine and diethylamine, or the amine may be replaced by using, as in Example 5, a crystal water-free, recently dried salt of an organic acid, e.g., Na asetate, Ca lactate, etc.

In reactions similar to that mentioned in Example 6, one may instead of triethylamine also use other tertiary amines, e.g., N,N-dimethylaniline.

What we claim is:

1. The method for cross-linking agarose or agar, wherein one of these substances is suspended in a substance selected from the group consisting of benzene, ether, petrol ether, toluene and dioxane, reacting the suspended substance with a compound containing two equal functional groups, each of said groups consisting of $-COCl$, $-SO_2Cl$ or $-N=C=S$ to produce cross-linking, filtering the cross-linked substance, washing the filtered cross-linked substance and then drying the washed cross-linked substance at room temperature.

2. Method according to claim 1, characterized in that as substances containing two functional $-COCl$ groups saturated dicarboxylic acid chlorides are used, namely oxalic acid dichloride, succinic acid dichloride, glutaric acid dichloride, and pimelic acid dichloride.

3. Method according to claim 1, characterized in that as substances containing two functional $-COCl$ groups unsaturated dicarboxylic acid chlorides are used, namely maleic acid dichloride.

4. Method according to claim 1, characterized in that as substances containing two functional $-COCl$ groups aromatic dicarboxylic acid chlorides are used, namely phthalic acid dichloride, isophthalic acid dichloride, terephthalic acid dichloride, naphthalene-1,2-dicarboxylic acid chloride.

5. Method according to claim 1, characterized in that as substances containing two functional $-SO_2Cl$ groups aryldisulphonic acid chlorides are used, namely benzene-1,3-disulphonic acid chloride.

6. Method according to claim 1, characterized in that as substances containing two functional $-N=C=S$ groups aliphatic diisothiocyanates are used, namely ethylene-1,2-diisothiocyanate, butylene-1,6-diisothiocyanate, hexylene-1,6-diisothiocyanate, octylene-1,8-diisothiocyanate, decylene-1,10-diisothiocyanate and butylene-1,3-diisothiocyanate.

7. Method according to claim 1, characterized in that as substances containing two functional $-N=C=S$ groups aromatic diisothiocyanates are used, namely p-phenylene diisothiocyanate.

8. Method according to claim 1, characterized in that in suspending the agarose a substance promoting the cross-linking reaction of agarose and preventing hydrolysis of agarose is used, namely diethylamine, N,N-dimethylaniline and sodium acetate.

* * * * *

UNITED STATES PATENT OFFICE
CERTIFICATE OF CORRECTION

Patent No. 3,860,573     Dated  January 14, 1975

Inventor(s)  Erkki Johani Honkanen et al.

It is certified that error appears in the above-identified patent and that said Letters Patent are hereby corrected as shown below:

On the Title the following should be included:

-- [30]   Foreign Application Priority Data
    Oct. 1, 1971         Finland ----------2762/71 --.

Signed and Sealed this ninth Day of September 1975

[SEAL]

Attest:

RUTH C. MASON
*Attesting Officer*

C. MARSHALL DANN
*Commissioner of Patents and Trademarks*